No. 782,405. Patented February 14, 1905.

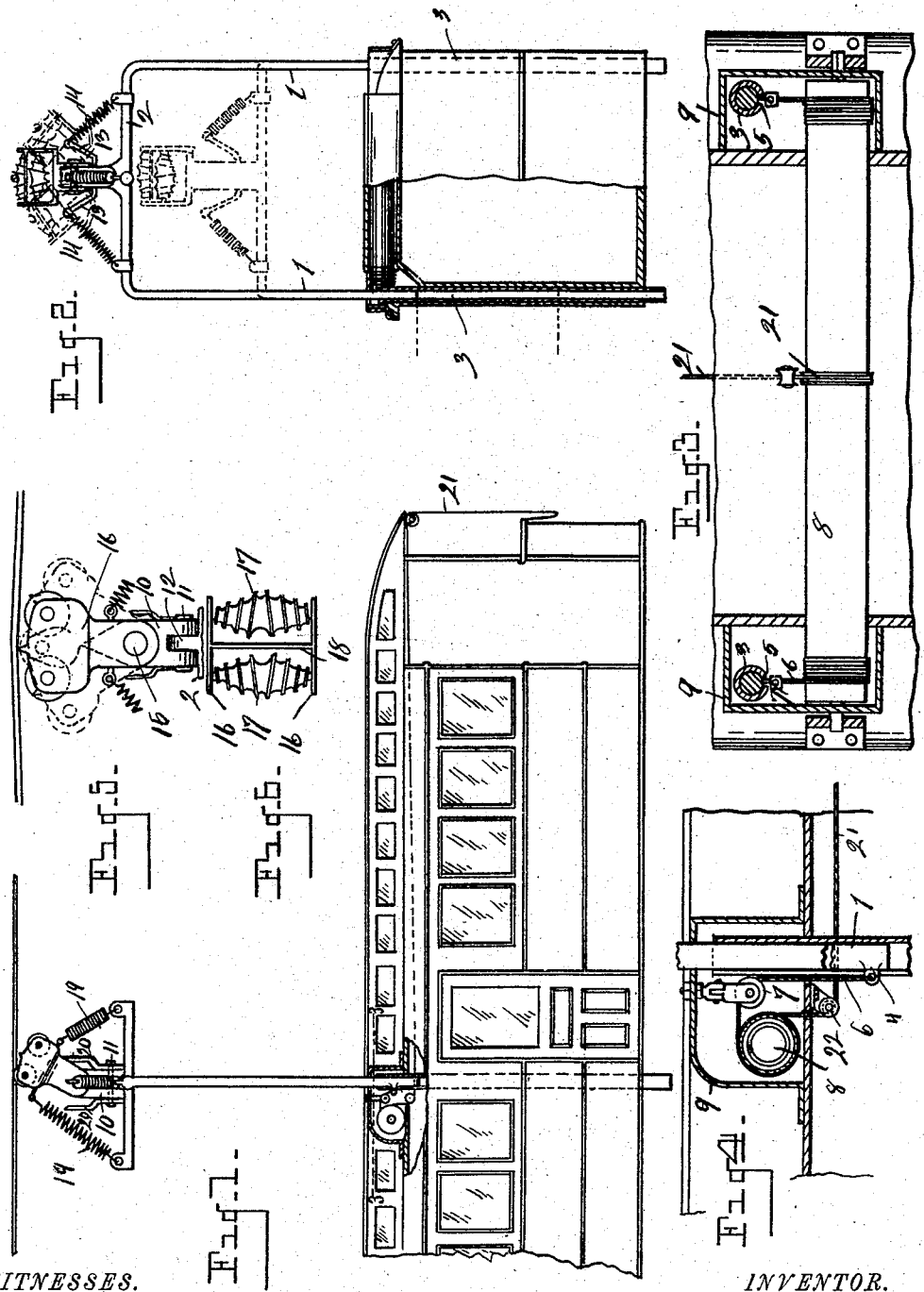

UNITED STATES PATENT OFFICE.

JOHN MARTLAND, OF DETROIT, MICHIGAN.

TROLLEY.

SPECIFICATION forming part of Letters Patent No. 782,405, dated February 14, 1905.

Application filed January 2, 1903. Renewed November 25, 1904. Serial No. 234,197.

*To all whom it may concern:*

Be it known that I, JOHN MARTLAND, a citizen of the United States, residing at Detroit, in the county of Wayne, State of Michigan, have invented certain new and useful Improvements in Trolleys; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to trolleys for electric railways; and it consists in the construction and arrangement of parts hereinafter fully set forth, and pointed out particularly in the claims.

The object of the invention is to provide a trolley that may be carried upon a vertically-movable frame adapted to be mounted in the center of the car, the arrangement being such as to prevent the trolley from leaving the overhead conductor and at the same time providing for universal movement of the trolley head or stand to enable the trolley to follow any bend or deflection in the conductor. A further arrangement provides for maintaining the trolley in yielding engagement with the conductor and for raising and lowering it, as occasion requires. The above object is attained by the mechanism illustrated in the accompanying drawings, in which—

Figure 1 is a side elevation of a section of a car having my improved trolley mounted thereon, a portion of the top of the car being broken away to show the location and arrangement of parts. Fig. 2 is an end elevation of a car, parts of which are sectioned, showing my improved trolley mounted thereon and a spring-actuated roller which maintains an upward tension upon the frame carrying the trolley. Fig. 3 is an enlarged horizontal section, as on line 3 3 of Fig. 1. Fig. 4 is a fragmentary detail in section, showing the construction and relative association of parts at one end of the spring-actuated roller. Fig. 5 is an elevation of the oscillatory head or fork carrying the trolley-wheels, and Fig. 6 is a plan view thereof.

A frame comprising the vertical standards 1, connected at their upper ends by the cross-bar 2, stands astride of the car, and the ends of said standards are adapted to slide in vertical guideways 3, located in the car-frame. The standards 1 are provided at their lower ends with brackets 4, which project through slots 5, formed in the wall of the guideways 3. Attached to said brackets are the cables 6, which pass over swiveled pulleys 7 and wind upon the opposite ends of the roller 8, which extends transversely of the top of the car, the projecting ends of said roller being confined in suitable housings 9. The roller 8 is spring-actuated and is adapted by reason of the tension of its spring to exert sufficient power through the cables 6 upon the standards 1 to maintain the frame comprising said standards and cross-bar 2 in an elevated position and yet allow said frame to rise and fall to enable the trolley carried by the frame to follow the undulations of the overhead conductor. As the frame rises and falls the standards 1 reciprocate vertically in the guideways 3 and the cables 6 wind onto and off of the roller 8. The spring-roller may be of the ordinary shade-roller pattern and need not be specifically described. Mounted centrally upon the cross-bar 2 is a trolley-stand 10, which is pivoted at 11 to an ear 12, (see Fig. 5,) extending from said cross-bar 2 of the frame, whereby the stand 10 is permitted a reciprocatory movement transversely of the car, as shown by dotted lines in Fig. 2, enabling the trolley to follow the deflections of the overhead conductor. Projecting from the stand 10 are the upwardly and outwardly extending arms 13, to the outer ends of which are attached the upper ends of the coiled springs 14, the lower ends of said springs being connected to the cross-bar 2. The springs 14 serve to normally maintain the stand in a vertical position and to return it to its normal position after being rocked or tilted in either direction.

Pivoted at 15 to the standard 10 is a fork 16. Journaled between the sides of the fork 16 are the trolley-wheels 17. These trolley-wheels are of peculiar shape and comprise elongated rollers tapering from the center to each end and provided with spiral grooves running from the ends to the center. The lenght of the rollers is such that should the overhead conductor leave the central groove in the rollers the spiral groove on either side will catch the conductor and direct it back into the central groove without permitting the conductor to entirely leave the trolley It is evident that where the spiral grooves in the trolley-wheel are formed to carry the conductor from the ends into the central groove with the car traveling in a certain direction such formation would operate to run the conductor from the trolley-wheel if the direction of movement of the car were reversed. To obviate this difficulty, I employ two spirally-grooved rollers or trolley-wheels separated by a bar 18, passing between them and connecting the sides to the fork. When the direction of the movement of the car is changed, the fork, rocking upon the pivot 15, will cause the bar 18 to engage the overhead conductor, as shown in Fig. 5, and by contact therewith tilt the fork in the opposite direction, so as to bring the opposite roller into action with the overhead conductor, so that the car traveling in either direction the trolley calculated to maintain the conductor in the center channel thereof will be in contact with said conductor.

The pivot 15 allows the fork to oscillate longitudinally of the car, and attached to the opposite sides of said fork are the coiled springs 19, which normally maintain the fork in a vertical position, but which allow it to move upon the pivot 15 and serve as well to maintain the trolley-wheel in yielding contact with the overhead conductor when the car is running, as shown in Fig. 1. To provide suitable stops for the fork to prevent it from tilting too far in either direction, arms 20 are bolted to the opposite sides of the stand 10 and are positioned to engage the sides of the fork and arrest it at the limit of its movement in both directions.

For the purpose of drawing the trolley downward from contact with the trolley-wire, a rope 21 is wound about the center of the roller 8, which passes from said roller over the pulley 22 and rearwardly to the end of the car within reach of the car-conductor. By drawing upon said rope the roller 8 will be rotated to unwind the cables 6 from the ends thereof and allow the frame carrying the trolley to descend, as shown by dotted lines in Fig. 2. Upon the release of the rope 21 the spring (not shown) within the roller 8 will rotate said roller to wind the cables 6 thereon and again raise the trolley into contact with the trolley-wire.

Having thus fully set forth my invention, what I claim as new, and desire to secure by Letters Patent, is—

1. In a trolley device, the combination of a vehicle, a vertically-movable frame mounted on the vehicle, means for yieldingly supporting said frame in an elevated position, a trolley-stand pivoted on said frame, a trolley-fork pivoted on said stand and means for returning said stand and fork to their normal position after a movement upon their pivots in either direction.

2. In a trolley device, the combination with a vehicle, of a vertically-movable frame held in vertical suspension, a trolley-stand pivoted to the upper end of said frame having springs attached to the opposite sides thereof, a trolley-fork pivoted to the upper end of said stand, the axis of the pivot of the stand being at right angles to that of the fork, springs supporting said fork upon opposite sides, and a trolley-wheel within said fork.

3. In a trolley device the combination of a car, a frame mounted upon said car carrying a trolley-wheel at its upper end, said frame having vertical standards, guideways in the sides of said car to receive said standards, a spring-actuated roller, cables wound about the ends of said roller and attached to the lower ends of said standards whereby the force of the spring of the roller is exerted to maintain the frame in a raised position and allow it to reciprocate vertically.

4. In a trolley device, the combination of a car, a vertically-movable frame mounted on the car, a trolley-wheel carried by the upper end of said frame, a spring-actuated roller, cables wound about the ends of said roller and attached to the sides of said frame, and a rope wound upon said roller independently of said cables and passing within reach of the conductor of the car.

5. In a trolley device, the combination of a car, a vertically-movable frame mounted on the car, a pivoted trolley-fork carried by said frame, two elongated trolley-wheels journaled in said fork having spiral channels therein extending in opposite directions, and a bar mounted on the fork sides and extending between said trolley-wheels.

In testimony whereof I sign this specification in the presence of two witnesses.

JOHN MARTLAND.

Witnesses:
E. S. WHEELER,
C. E. DAVIS.